March 30, 1937.   E. W. BOERSTLER   2,075,696
APPARATUS FOR PRODUCING THERAPEUTIC RAYS
Filed Dec. 21, 1934
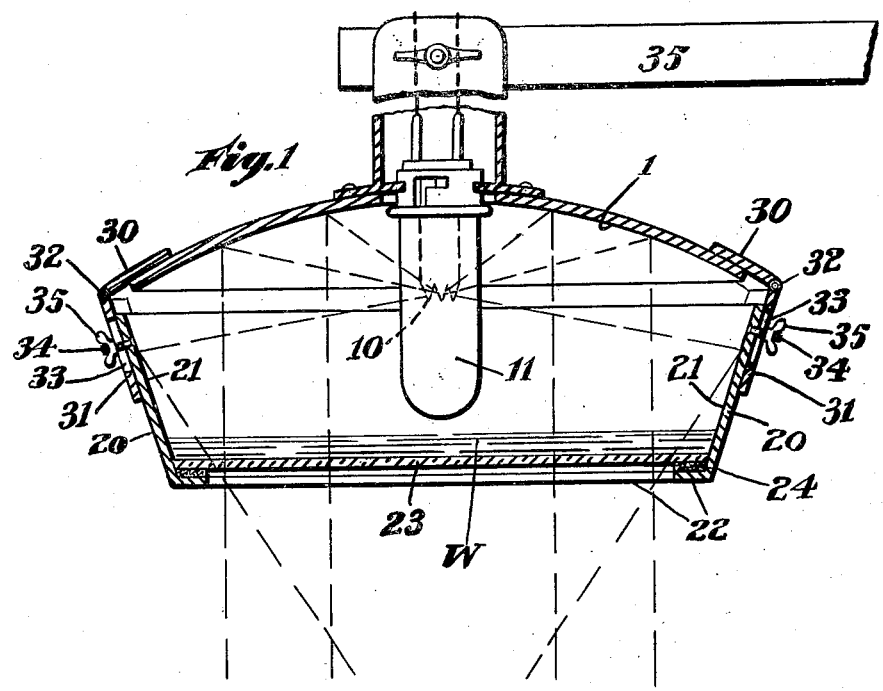
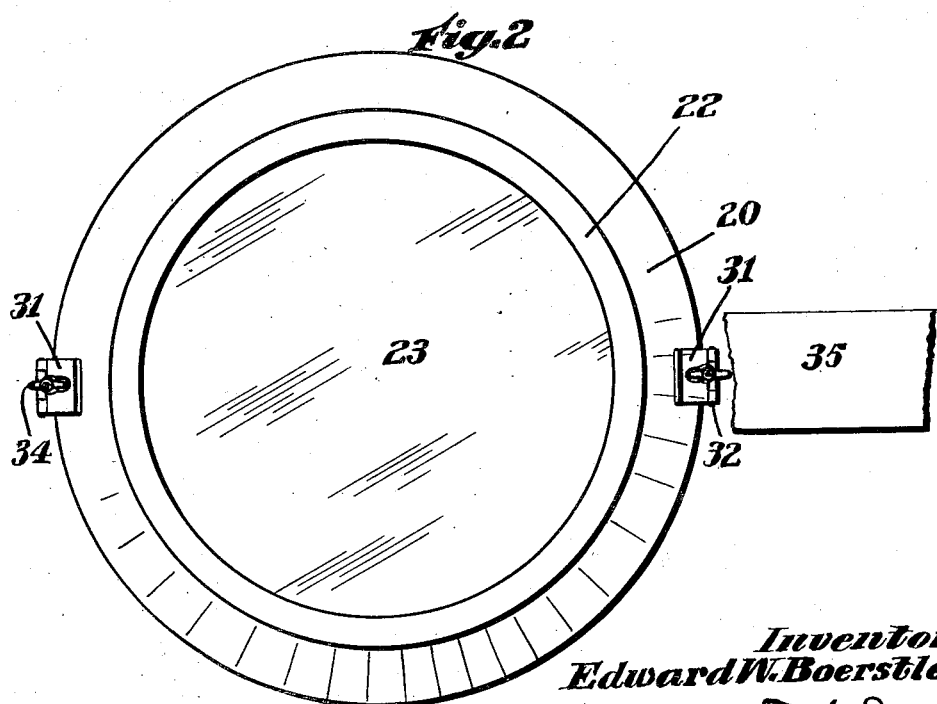
Inventor
Edward W. Boerstler
By Attorney Patented Mar. 30, 1937

2,075,696

UNITED STATES PATENT OFFICE 2,075,696

APPARATUS FOR PRODUCING THERAPEUTIC RAYS

Edward W. Boerstler, Watertown, Mass.

Application December 21, 1934, Serial No. 758,629

9 Claims.  (Cl. 250—34)

In my present invention I contemplate certain improvements in the apparatus for carrying out my previous developments in therapeutic treatment of similar utilization of enerby of certain characteristics.

In my previous Letters Patent No. 1,800,277, I disclosed a method of producing therapeutic rays of definite character and properties. From my observations I conceive of it as desirable in many conditions to exceed the energy values of valuable spectral regions found in solar radiations.

The problem of making practically available to humanitarian usage such potential resources was great.

According to my present invention I provide a simplified basis of apparatus for therapeutic treatment by which is made possible the release of apparatus at a reasonable profit to the manufacturer and responsible source of service by reason of which the suffering public is served.

As a result of clinical experiments extending over a long period I have found that exclusive of the treatment of disturbances of inorganic mineral metabolism, such as "rickets", the major therapeutic value of solar radiation is produced by those wave lengths which are capable of penetrating into appreciable depths of blood filled tissue. Although photo-chemical reactions are induced by irradiation with the full spectrum of solar radiation, the evidence indicates that the primary action inducing the observed therapeutic results is essentially thermal in nature, doubtless through the production of anti-bodies in the blood, together with a marked stimulation of the organisms' normal defensive mechanism.

While the art of therapy has had the benefit of the highly scientific and accurate work of many men of great skill and inspiration, nevertheless it has suffered much from ignorance and more from selfish commercialism. The exposure of human tissue to artificial energy on anything but a careful basis of medical science is to be condemned. Over-exposure even to the solar energy is known to be dangerous.

Attempts to use high energy sources have met with much difficulty because of the exaggeration of the effects of undesirable wave lengths which in low energy sources have not seemed so objectionable. For example, I have found it desirable to use a 1000 watt tungsten source or even one of higher energy as a source, but at anything like that energy value the effect of the included long wave length infra-red rays is so increased that the patient would not be able to stand the heat or caustic effects and would be burned if directly exposed.

In the ultra-violet region, although the lower wave length limit of 2900 A. U. is generated by the high temperature tungsten filament and transmitted by my soda lime or like bulb envelope, the energy value of the full ultra-violet component is somewhat less than clear mid-day mid-summer sunlight, which produces a relatively rapid erythema and subsequent pigmentation, as a defense against amounts of radiation to which we are not yet wholly adapted.

It is well established that water filters out most of the infra-red region beyond 14,000 A. U. and it is for this reason that the water filter in the present method is preferably constructed so that it intercepts these radiations from the source, as will be seen from the drawing and later description.

This makes possible a maximum application of energy from 5500 to about 14,000 A. U. but allows an optimum and sensibly comfortable amount of the longer infra-red wave lengths to reach the patient. Wave lengths longer than about 40,000 A. U. are not transmitted by the vitreous shield and filter system which give a shut-off coinciding closely with the average atmospheric cut-off.

Briefly stated, my concept is that of a selectively developed group of radiations having its maximum peak in the penetrative wave lengths just below the visible spectrum but excluding a large amount of the longer wave lengths of the infra-red. By the exclusion also of the ultra-violet beyond 2900 or 3000 A. U. as in my previous patent above referred to, I am able to provide a novel type of radiation of high energy and yet of nonescharotic effects and high therapeutic value.

My new basis of apparatus is simply illustrated in the accompanying drawing. In the drawing:

Fig. 1 is a simple illustrative side view, partly in section of a lamp equipment serviceable according to my invention, and Fig. 2 is a lower face view of the same.

In putting my previous inventions into practical effect and to attain even higher efficiency I have devised an apparatus basis as illustratively shown in the drawing previously described.

In this my energy source is indicated as a tungsten lamp or bulb having a source or filament 10 surrounded by a bulb or casing 11 of soda lime or like equivalent glass providing the shut-off for extreme ultra-violet rays according to my prior patents.

As a convenient apparatus basis for applicative treatment I have indicated a reflector 1 of figure suitable for the projected beam desired. This may be spherical or usually of paraboloidal figure as the usual beam concentration is one of generally cylindric order, as indicated by the broken lines in Fig. 1.

Below the reflector 1 is a water cell casing consisting of flaring walls 20 having reflective inner surfaces 21 which may be conveniently provided by chrome nickeling the inner face of the flaring wall.

The casing has an open bottom surrounded by a rim or flange 22 on which rests a transparent plate 23. This is of quartz glass or may be of other selective ray filtering material. The plate 23 rests on the flange 22 with an interposed gasket or cementitious packing to make a water tight joint to retain without leakage a suitable depth (usually about ¼ inch) of water indicated at W.

The cell may be supported from the reflector 1 by adjustable brackets. As shown these may be hinged members consisting of a leaf 30 attached to the reflector edge and a leaf 31 hinged as at 32. The leaf 31 is slotted as at 33 and adjustably clamped by a wing screw 34.

Such an apparatus or head may be supported in any convenient manner as by arm 35 usually counterweighted (not shown) so as to be adjustable to convenient positions for the direction of the beam upon the patient in any desired posture.

The efficiency of these devices is very high and shows a fifty percent gain in transmission over the full spectral range by reason of its single wall structure as contrasted to a double wall cell. It shows a lessening of surface reflection losses which are approximately four percent at each surface, presenting a different refractive index.

On account of the freedom of its contained water to develop its own currents no forced or mechanical circulation is necessary. Fluid losses due to evaporation are easily made up by additions from time to time. In fact, the evaporation of the water or other fluid under the intense heat of the high energy tungsten lamp produces according to my invention a new advantage. Such an apparatus becomes in effect an activator or ionizer and there is a distinct release of ozone desired in many cases for its stimulative effect on the patient while under the radiant treatment. By the addition of aromatic or like medicaments to the water or fluid, various desired treatments may be given to patients requiring such at the same time that they are receiving the beam treatment under the lamp.

Although I have emphasized in my disclosure the therapeutic beam feature of my invention, its ionizing, vaporizing and humidifying functions are not to be overlooked and are to be considered as parts of my inventive concept.

What I therefore claim and desire to secure by Letters Patent is:—

1. In apparatus for projecting a beam of therapeutic rays of predetermined thermal characteristics, a downwardly directed reflector, a high temperature source of energy disposed substantially in the reflector focus, an open top filter disposed below the reflector, and comprising a shallow pan having a bottom opening surrounded by a narrow flange, a ray transmitting bottom disc covering said open bottom and having its edge resting on said flange and adapted to hold a body of water thereby making of it a water filter.

2. In apparatus for projecting a beam of therapeutic rays of predetermined thermal characteristics, a downwardly directed reflector, a high temperature source of energy disposed substantially in the reflector focus, an open top filter disposed below the reflector, and comprising a shallow pan having a bottom opening surrounded by a flange having an upwardly flaring inwardly reflecting side wall, a ray transmitting bottom disc covering said open bottom and having its edge resting on said flange and adapted to hold a body of water thereby making of it a water filter.

3. In apparatus for projecting a beam of therapeutic rays of predetermined thermal characteristics, a downwardly directed reflector, a high temperature source of energy disposed substantially in the reflector focus, an open top pan having a bottom opening surrounded by a narrow flange, a ray transmitting bottom disc covering said open bottom and having the edge resting on said flange, a water-tight packing between said disc edge and flange and adapted to hold a body of water within said pan and make of it a water filter, said pan edge and reflector edge having intermediate spacing to provide an outward vapor discharge about the periphery of the pan, whereby the ionized and heated vapor from the water of the pan are passed outwardly as developed under the high energy tungsten source.

4. In apparatus for projecting a beam of therapeutic rays of predetermined thermal characteristics, a downwardly directed reflector, a high temperature source of energy disposed substantially in the reflector focus, an open top filter adapted to hold a body of water below the reflector, a ray transmitting bottom in said filter for permitting the passage of the reflected beam.

5. Apparatus for projecting a beam of therapeutic rays of predetermined spectral characteristics comprising a concaved reflector, a high temperature source of energy disposed axially of said reflector, and a container disposed below said reflector and having an outwardly flaring wall provided with a reflecting surface and a bottom including a ray transmitting member, said container being adapted to receive a body of fluid of predetermined depth, said fluid being adapted to filter from the passing rays the undesirable infra red rays, said wall reflecting surface directing the rays impinging thereon inwardly and downwardly through said fluid and toward the predetermined focal point.

6. Apparatus as described in claim 5 in which the container is spaced from the reflector a predetermined distance and has an opening to permit the escape of activated vapors resulting from the evaporation of said irradiated fluid resulting from the absorption by said fluid of said undesired rays from said beam as it traverses said fluid.

7. Apparatus for projecting a beam of therapeutic rays of predetermined spectral characteristics comprising a reflector, a high temperature source of energy disposed axially of said reflector, and a fluid filter cell beneath said reflector and energy source and adapted to transmit the desired rays to the predetermined focal point and to filter from said beam the undesired infra red rays, said cell being open to atmosphere whereby there is released from the cell the activated vapors resulting from the evaporation of said irradiated fluid in said cell.

8. Apparatus for projecting a beam of therapeutic rays of predetermined spectral characteristics comprising a concaved reflector, a high temperature source of energy disposed axially of said reflector, and a fluid filter cell beneath said reflector, said cell having an outwardly flaring wall provided with a reflecting surface adapted to direct the rays impinging thereon inwardly and downwardly through said cell and toward the predetermined focal point.

9. Apparatus as described in claim 8 in which the filter cell is open to atmosphere.

EDWARD W. BOERSTLER.